US012621147B2

(12) United States Patent
Qi et al.

(10) Patent No.: US 12,621,147 B2
(45) Date of Patent: May 5, 2026

(54) METHOD, DEVICE AND SYSTEM FOR MANAGING CARBON DATA AND RELATED APPARATUS

(71) Applicant: Siemens Aktiengesellschaft, Munich (DE)

(72) Inventors: Lin Qi, Beijing (CN); Hong Rui Li, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 19/114,194

(22) PCT Filed: Sep. 23, 2022

(86) PCT No.: PCT/CN2022/121077
§ 371 (c)(1),
(2) Date: Mar. 21, 2025

(87) PCT Pub. No.: WO2024/060244
PCT Pub. Date: Mar. 28, 2024

(65) Prior Publication Data
US 2025/0266996 A1 Aug. 21, 2025

(51) Int. Cl.
*H04L 29/06* (2006.01)
*G06Q 30/018* (2023.01)
(Continued)

(52) U.S. Cl.
CPC ............. *H04L 9/30* (2013.01); *G06Q 30/018* (2013.01); *G06Q 50/04* (2013.01)

(58) Field of Classification Search
CPC ..... H04L 9/30; H04L 9/0625; H04L 67/1074; H04L 63/12; H04L 63/123; H04L 9/0847;
(Continued)

(56) References Cited

U.S. PATENT DOCUMENTS 10,983,958 B1 4/2021 Miller
11,531,387 B1 * 12/2022 Citron ................ G06Q 30/0201
(Continued)

FOREIGN PATENT DOCUMENTS

CN 109 003 196 A 12/2018
CN 113 609 443 A 11/2021
CN 114 819 997 A 7/2022

OTHER PUBLICATIONS

Search Report for International Application No. PCT/CN2022/121077, 8 pages, Feb. 28, 2023.

*Primary Examiner* — Joseph P Hirl
*Assistant Examiner* — Leynna Truvan
(74) *Attorney, Agent, or Firm* — Slayden Grubert Beard PLLC

(57) ABSTRACT

An example includes: generating component carbon footprint data of a component, wherein the data comprises data of a material for manufacturing the component and addon component carbon footprint data generated in the production and processing of the component; storing an encryption result of the addon data in a first blockchain to trigger generation and storage of encrypted component carbon footprint data based on the encryption result of the addon component carbon footprint data and pre-stored first encrypted material carbon footprint data; acquiring a first verifiable credential for average footprint data of a batch of components containing the component, wherein a public key for verifying the credential is stored in a second blockchain; and sending the component data and the presentation generated to the manufacturer, so the manufacturer verifies the presentation and the footprint data based on the first encrypted component data and the public key.

20 Claims, 6 Drawing Sheets

(51) Int. Cl.
  *G06Q 50/04* (2012.01)
  *H04L 9/30* (2006.01)

(58) Field of Classification Search
  CPC ................. G06Q 30/018; G06Q 50/04; G06Q
              20/40975; G06Q 20/38; G06Q 30/0278;
              G05B 2219/37202; G05B 2219/13187;
              G05B 2219/31166; G05B 2219/31171;
              G05B 2219/31206; G05B 2219/31483;
              G05B 2219/31485; G01N 2021/3196;
              G01V 1/46; G01V 1/48; G01V 1/50;
              G01V 3/36; G01V 3/38; G01V 5/271;
              G01V 2210/40; G16B 50/40; G11C
          2213/35; H04M 1/2753; H04N 1/00766;
              H04N 1/4486; H04N 21/2351; H04N
              1/00522; H04W 12/03; H01G 11/32;
                  H01G 11/34; H01G 11/86; H01L
              23/4928; H01M 8/0612; F01K 25/10;
              F04B 2015/0818; F16C 2206/02; F23J
              2215/50; F24F 2110/70; F25J 2210/80;
                  F27M 2001/04; H04H 60/23; H04Q
                                          2213/13339
  See application file for complete search history.

(56) References Cited

U.S. PATENT DOCUMENTS

2019/0108516 A1* 4/2019 Jawaharlal ............ H04L 9/3239
2019/0172159 A1* 6/2019 Sun ...................... G06Q 30/018
2021/0326974 A1* 10/2021 Leng .................... H04L 9/0825

* cited by examiner

METHOD, DEVICE AND SYSTEM FOR MANAGING CARBON DATA AND RELATED APPARATUS

CROSS-REFERENCE TO RELATED APPLICATIONS

This application is a U.S. National Stage Application of International Application No. PCT/CN2022/121077 filed Sep. 23, 2022, which designates the United States s of America, the contents of which are hereby incorporated by reference in their entirety.

TECHNICAL FIELD

The present disclosure relates to computers. Various embodiments of the teachings herein include methods, devices, and/or systems for managing carbon data.

BACKGROUND

Product Carbon Footprint (PCF) data is an approach to calculate the life cycle emissions of a product or service. For a product, the approach includes analysis of various life cycle stages from raw material extraction and processing, manufacturing, distribution, and use stage to end-of-life treatment. Using such an approach, the carbon emissions through the product supply chain can be better understood, and energy-saving opportunities can be better identified.

PCF data is calculated by collecting original data from factory product processing and upstream supply chain to estimate $CO_2$ emissions. Manual operations are always involved when the original data is then collected and transmitted. Maloperations, malicious tampering, and illegal manipulations are inevitable. Even if human factors are ignored, there will be other security problems.

SUMMARY

Therefore, a carbon data management scheme that can ensure the accuracy and reliability of PCF data is urgently needed. In view of this, the present disclosure describes methods, devices, and systems for managing carbon data, which are used to at least partially solve the above technical problems.

For example, some embodiments of the present disclosure include a method for managing carbon data, comprising: generating component carbon footprint data of a component, wherein the component carbon footprint data comprises material carbon footprint data of a material for manufacturing the component and addon component carbon footprint data generated in the production and processing of the component; storing an encryption result of the addon component carbon footprint data in a first blockchain to trigger the first blockchain to generate and store first encrypted component carbon footprint data of the component based on the encryption result of the addon component carbon footprint data and pre-stored first encrypted material carbon footprint data; acquiring a first verifiable credential for average component carbon footprint data of a batch of components containing the component, wherein a first public key for verifying the first verifiable credential is stored in a second blockchain; and sending, in response to a component carbon footprint request from a product manufacturer, the component carbon footprint data and the first verifiable presentation generated based on the first verifiable credential to the product manufacturer, so that the product manufacturer verifies the first verifiable presentation and the component carbon footprint data based on the first encrypted component carbon footprint data stored in the first blockchain and the first public key stored in the second blockchain.

As another example, some embodiments of the present disclosure include a method for managing carbon data, comprising: receiving component carbon footprint data of a component for manufacturing products and a first verifiable presentation, wherein the first verifiable presentation is generated based on a first verifiable credential for average component carbon footprint data of a batch of components containing the component; acquiring first encrypted component carbon footprint data of the component from a first blockchain; acquiring a first public key for verifying the first verifiable credential from a second blockchain; and verifying the component carbon footprint data and the first verifiable presentation based on the first encrypted component carbon footprint data and the first public key.

As another example, some embodiments of the present disclosure include a device for managing carbon data, comprising: a generating module, configured to generate component carbon footprint data of a component, wherein the component carbon footprint data comprises material carbon footprint data of a material for manufacturing the component and addon component carbon footprint data generated in the production and processing of the component; a triggering module, configured to store an encryption result of the addon component carbon footprint data in a first blockchain to trigger the first blockchain to generate and store first encrypted component carbon footprint data of the component based on the encryption result of the addon component carbon footprint data and pre-stored first encrypted material carbon footprint data; a credential acquiring module, configured to acquire a first verifiable credential for the average component carbon footprint data of a batch of components containing the component, wherein a first public key for verifying the first verifiable credential is stored in a second blockchain; and a sending module, configured to send, in response to a component carbon footprint request from a product manufacturer, the component carbon footprint data and the first verifiable presentation generated based on the first verifiable credential to the product manufacturer, so that the product manufacturer verifies the first verifiable presentation and the component carbon footprint data based on the first encrypted component carbon footprint data stored in the first blockchain and the first public key stored in the second blockchain.

As another example, some embodiments of the present disclosure include a device for managing carbon data, comprising: a first receiving module, configured to receive component carbon footprint data for a component for manufacturing products and a first verifiable presentation, wherein the first verifiable presentation is generated based on a first verifiable credential of average component carbon footprint data of a batch of components containing the component; a data acquiring module, configured to acquire first encrypted component carbon footprint data of the component from a first blockchain; a key acquiring module, configured to acquire a first public key for verifying the first verifiable credential from a second blockchain; and a verifying module, configured to verify the component carbon footprint data and the first verifiable presentation based on the first encrypted component carbon footprint data and the first public key.

As another example, some embodiments include an a system for managing carbon data, comprising: a first blockchain, configured to store an encryption result of addon component carbon footprint data generated in the production and processing of a component, and to generate and store first encrypted component carbon footprint data of the component based on the encryption result of the addon component carbon footprint data and pre-stored first encrypted material carbon footprint data of a material for manufacturing the component, so that the product manufacturer verifies component carbon footprint data of the component based on the first encrypted component carbon footprint data; and a second blockchain, configured to store a first public key for verifying a first verifiable credential for average component carbon footprint data of a batch of components containing the component, so that the product manufacturer verifies the component carbon footprint data based on the first public key and a first verifiable presentation generated based on the first verifiable credential.

As another example, some embodiments of the present disclosure include an electronic apparatus comprising a processor, a memory, a communication interface and a communication bus, wherein the processor, the memory and the communication interface communicate with each other through the communication bus; the memory is used to store at least one executable instruction, and the executable instruction causes the processor to execute one or more of the methods described herein.

As another example, some embodiments of the present disclosure include a computer-readable storage medium storing computer executable instructions, wherein the computer executable instructions, when executed, cause the processor to execute one or more of the methods described herein.

As another example, some embodiments of the present disclosure include a computer program product comprising a computer-readable storage medium storing a program, wherein the program, after being loaded into a memory of a computer, causes the computer to execute one or more of the methods described herein.

LIST OF REFERENCE NUMBERS

Figure 1:
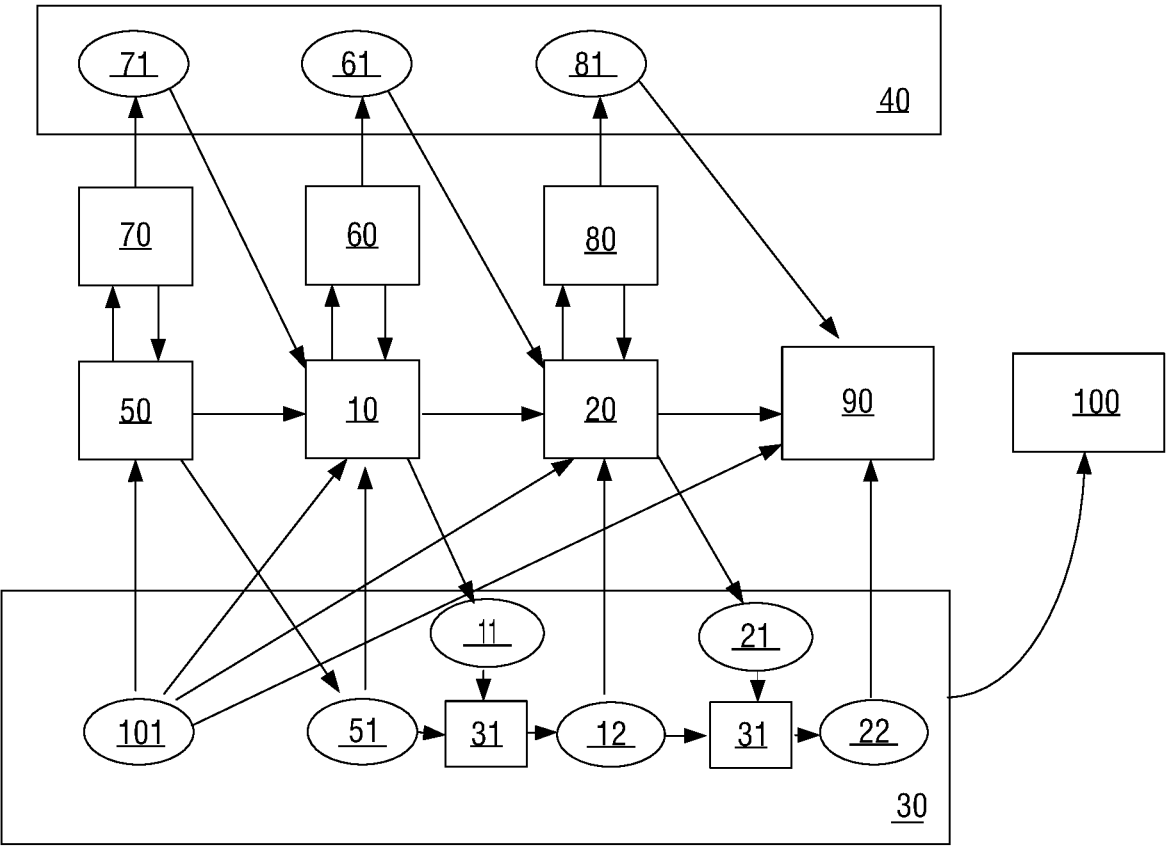
FIG. 1 is an architecture schematic diagram of an example system for carbon data incorporating teachings of the present disclosure.

10: component manufacturer; 20: product manufacturer; 30: first blockchain

40: second blockchain; 50: material provider; 60: first certifier

70: second certifier; 80: third certifier; 90: client

100: trusted third party; 61: first public key; 71: second public key

81: third public key; 101: public key for homomorphic encryption;

31: chain code

51: first encrypted material carbon footprint data;

11: encryption result of addon component carbon footprint data

12: first encrypted component carbon footprint data;

21: encryption result of addon product carbon footprint data

22: first encrypted product carbon footprint data

S201: generating component carbon footprint data of a component

S202: storing the encryption result of the addon carbon footprint data in a first blockchain to trigger the first blockchain to generate and store the first encrypted component carbon footprint data of the component based on the encryption result of the addon component carbon footprint data and pre-stored first encrypted material carbon footprint data

S203: acquiring a first verifiable credential for the average component carbon footprint data of a batch of components containing the component

S204: sending, in response to a component carbon footprint request from a product manufacturer, the component carbon footprint data and the first verifiable presentation generated based on the first verifiable credential to the product manufacturer, so that the product manufacturer verifies the first verifiable presentation and the component carbon footprint data based on the first encrypted component carbon footprint data stored in the first blockchain and the first public key stored in the second blockchain

S301: receiving component carbon footprint data of a component for manufacturing a product and a first verifiable presentation

S302: acquiring first encrypted component carbon footprint data of the component from a first blockchain

S303: acquiring a first public key from a second blockchain

S304: verifying the component carbon footprint data and the first verifiable presentation based on the first encrypted component carbon footprint data and the first public key

400, 500: device for managing carbon data

401: generating module; 402: triggering module; 403: credential acquiring module

404: sending module; 501: first receiving module; 502: data acquiring module

503: key acquiring module; 504: verifying module

600: electronic apparatus; 602: processor; 604: communication interface

606: memory; 608: communication bus; 610: executable instructions

DETAILED DESCRIPTION

The teachings of the present disclosure include methods, devices, and systems for managing carbon data in which the component carbon footprint data of the component is generated, and the encryption result of the addon component carbon footprint data is stored in a first blockchain to trigger the first blockchain to generate and store the first encrypted component carbon footprint data of the component based on the encryption result of the addon component carbon footprint data and pre-stored first encrypted material carbon footprint data, so that the product manufacturer can acquire the first encrypted component carbon footprint data from the first blockchain to verify the validity of the component carbon footprint data, thereby ensuring the confidentiality, integrity and traceability of the component carbon footprint data at the micro level. Further, a first verifiable credential for the average component carbon footprint data is acquired, and the first verifiable presentation generated based on the first verifiable credential is sent to the product manufacturer, so that the product manufacturer can verify the validity of the first verifiable presentation and the rationality of the component carbon footprint data based on the first public key stored in the second blockchain, so as to ensure the authenticity of the data and the identity privacy of suppliers at the micro level. Thus, this scheme can ensure the reliability, security and transparency of the carbon footprint data while protecting the identity privacy of suppliers.

In order to make the purpose, technical scheme, and advantages of the present disclosure clearer, the teachings of the present disclosure will be further explained in detail with reference to the drawings and embodiments hereinafter. Obviously, the described embodiments are merely some embodiments of the present disclosure, rather than all of the embodiments. Based on the embodiments in the present disclosure, all other technical schemes obtained by those skilled in the art belong to the scope of protection in the present disclosure.

As mentioned above, manual operations are involved when the original data is the collected and transmitted. Maloperations, malicious tampering, and illegal manipulations are inevitable. Even if human factors are ignored, there will be other security problems. In order to ensure the security and reliability of PCF data, different perspectives need to be considered.

For example, from the perspective of product manufacturers (i.e., factories), it is necessary to consider: integrity of data, that is, ensuring that there is no data tampering; authenticity of data, that is, ensuring the reliability of data; identity privacy, that is, protecting the identity privacy of suppliers. In some cases, it requires to provide emission data of materials or components without revealing information about suppliers. For another example, from the perspective of suppliers, confidentiality should be considered, that is, only the expected person or organization can see the actual emission data. For still another example, from the perspective of the management system or the managing method, usability should be considered, that is, it is more practical. Generally speaking, authenticity of data, identity privacy and CIA triple (i.e., integrity, confidentiality and availability) should be considered. Therefore, in related areas, a method of a decentralized blockchain (that is, a DID blockchain) and a Verifiable Credential (VC) are used to manage PCF data. The PCF data are not submitted to the DID blockchain. The DID blockchain is mainly used for VC certification. However, due to the computational complexity of VC, this scheme can only create one VC for a batch or a series of products, and it is difficult or even impossible to create a VC for each individual product, that is, CIA triple and supplier privacy can only be supported at the macro level, but it is not available at the micro level.

In addition, in another related technology, a standard blockchain (for example, Fabric blockchain) is used to store PCF data of each individual product, which supports the integrity and traceability of data at the micro level. In this scheme, the Fabric blockchain is used to store the PCF data of each supplier in the supply chain, that is, the PCF data or the hash value thereof is provided to the Fabric blockchain, so that it is difficult to realize supplier privacy protection and data authenticity at the same time.

In order to at least partially solve the above problems, the teachings of the present disclosure include methods for managing carbon data for at least partially solving the above technical problems. The specific implementation of the embodiment of the present disclosure will be further explained with reference to the drawings of the embodiment of the present disclosure hereinafter.

FIG. 1 is an architecture schematic diagram of an example system for carbon data incorporating teachings of the present disclosure. As shown in FIG. 1, the system for carbon data can comprise: a component manufacturer 10, also referred to as an intermediate supplier, which is configured to provide a product manufacturer 20 with a component for manufacturing a product; a product manufacturer 20, also referred to as a factory, which is configured to provide the product; and a first certifier 60, which is configured to verify the average component carbon footprint data of a batch or series of components provided by the component manufacturer 10, and generate a first verifiable credential for the average component carbon footprint data, which can also be referred to as component VC.

The first blockchain 30 is configured to store various encrypted carbon footprint data. For example, the first blockchain 30 may store the encryption result of the material carbon footprint data of material for manufacturing the component (i.e., a first encrypted material carbon footprint data 51). For another example, the first blockchain 30 may store the encryption result of the addon component carbon footprint data 11 generated in the production and processing of the component, and the encryption result of component carbon footprint data of the component (i.e., a first encrypted component carbon footprint data 12). The component carbon footprint data comprises the material carbon footprint data of the material for manufacturing the component and the addon carbon footprint data of the component. For another example, the first blockchain 30 may store the encryption result of the addon product carbon footprint data generated in the production and processing of the product, and the encryption result of product carbon footprint data of the product (i.e., a first encrypted product carbon footprint data 22). The product carbon footprint data comprises carbon footprint data of the component for manufacturing the product and addon product carbon footprint data of the product. The first blockchain 30 may include a chain code 31 for performing operation, such as additive homomorphic operation, on the encrypted carbon footprint data. For example, the chain code 31 can perform additive homomorphic operation on the encryption result of the addon component carbon footprint data 11 from the component manufacturer 10 and the first encrypted material carbon footprint data 51 stored in the first blockchain 30 to generate the first encrypted component carbon footprint data 12. The chain code 31 can also perform additive homomorphic operation on the encryption result of the addon product carbon footprint data 21 from the product manufacturer and the first encrypted component carbon footprint data 12 stored in the first blockchain 30 to generate the first encrypted product carbon footprint data 22.

A second blockchain 40, can be, for example, a Decentralized Identity (DID) blockchain. The second blockchain 40 is configured to store the public key of the first certifier 60 (i.e., the first public key 61). The first public key 61 is used to verify the component VC.

In some embodiments, the product manufacturer 20 may request the component carbon footprint data from the component manufacturer 10, request the first encrypted component carbon footprint data 12 from the first blockchain 30, and request the first public key 61 from the second blockchain 40. Thereafter, the product manufacturer 20 verify the component carbon footprint data based on the first encrypted component carbon footprint data 12 and the first public key 61.

In some embodiments, the product manufacturer 20 may request the component carbon footprint data from the component manufacturer 10, and verify the material carbon footprint data based on the first encrypted component carbon footprint data 12 requested from the first blockchain 30.

In some embodiments, the product manufacturer 20 may request the component carbon footprint data from the component manufacturer 10. In response, the component manufacturer 10 provides the component carbon footprint data and the corresponding first verifiable presentation to the product manufacturer 20, and the first verifiable presentation is generated by the component manufacturer 10 based on the first verifiable credential. The product manufacturer 20 can verify the material carbon footprint data and the first verifiable presentation based on the encrypted component carbon footprint data 12 requested from the first blockchain 30 and the first public key 61 requested from the second blockchain 40.

In some embodiments, as shown in FIG. 1, the system for carbon data further comprises a material provider 50, which is configured to provide material for manufacturing the component; and a second certifier 70, which is configured to verify the average material carbon footprint data of a batch or a series of materials provided by the material provider 50, and generate a second verifiable credential, namely material VC, for the average material carbon footprint data. The second certifier 70 may store its public key in the second blockchain 40 as a second public key 71. The second public key 71 is used to verify the material VC.

In some embodiments, the component manufacturer 10 may request the material carbon footprint data from the material provider 50, request the first encrypted material carbon footprint data 51 from the first blockchain 30, and request the second public key 7171 from the second blockchain 40. Thereafter, the component manufacturer 10 verify the material carbon footprint data based on the first encrypted material carbon footprint data 51 and the second public key 71.

In some embodiments, the component manufacturer 10 may request the material carbon footprint data from the material provider 50, and verify the material carbon footprint data based on the first encrypted material carbon footprint data 51 requested from the first blockchain 30.

In some embodiments, the component manufacturer 10 requests the material carbon footprint data from the material provider 50. In response, the material provider 50 provides the material carbon footprint data corresponding and the second verifiable presentation. The second verifiable presentation is generated by the material provider 50 based on the second verifiable credential.

The component manufacturer 10 can verify the material carbon footprint data and the second verifiable presentation based on the first encrypted material carbon footprint data 51 requested from the first blockchain 30 and the second public key 71 requested from the second blockchain 40.

The material provider, the component manufacturer and the product manufacturer are relative. In the case that the material provider has a upstream supplier, the material provider 50 can be understood as the component manufacturer 10 for the upstream supplier.

In some embodiments, as shown in FIG. 1, the system for carbon data further comprises a third certifier 80, which is configured to verify the average product carbon footprint data of a batch or series of products provided by the product manufacturer 20, and generate a third verifiable credential, namely product VC, for the average product carbon footprint data. Accordingly, the third certifier 80 can store its public key in the second blockchain as a third public key 81. The third public key 81 is used to verify the product VC.

In some embodiments, as shown in FIG. 1, the system for carbon data further comprises a client 90, which can request product carbon footprint data, can request the first encrypted product carbon footprint data 22 from the first blockchain 30, and can request a third public key 81 from the second blockchain 40.

Thereafter, the client 90 verify the product carbon footprint data, based on the first encrypted product carbon footprint data 22 and the s third public key 81.

In some embodiments, the client 90 may request the product carbon footprint data from the product manufacturer and verify the product carbon footprint data based on the first encrypted product carbon footprint data 22 requested from the first blockchain 30.

In some embodiments, the client 90 may request the product carbon footprint data from a product manufacturer. In response, the product manufacturer provides the product carbon footprint data and the third verifiable presentation. The third verifiable presentation is generated by the product manufacturer based on the third verifiable credential. The client 90 can verify the product carbon footprint data and the third verifiable presentation based on the first encrypted product carbon footprint data 22 requested from the first blockchain 30 and the third public key 81 requested from the second blockchain 40.

In some embodiments, the client may request the chain code 31 from the first blockchain 30, and verify the correctness the process of the homomorphic encryption operation of the carbon footprint data by checking the chain code 31.

In some embodiments, as shown in FIG. 1, the system for carbon data further comprises a trusted third party 100, such as a regulatory authority. The trusted third party 100 can generate a key pair for homomorphic encryption, and the trusted third party 100 can save the private key for decryption in the key pair, and store the public key for encryption in the key pair in the first blockchain 30 as the public key for homomorphic encryption 101, so that the material provider 50, the component manufacturer 10, the product manufacturer 20 and the client 90 can acquire the public key for homomorphic encryption 101 from the first blockchain 30 for encryption.

In some embodiments, the trusted third party 100 can request, as needed, various encrypted carbon footprint data from the first blockchain 30, for example, the first encrypted material carbon footprint data 51, the first encrypted component carbon footprint data 12, the first encrypted product carbon footprint data 22, the encryption result of addon component carbon footprint data 11, and the encryption result of addon product carbon footprint data 21. Thereafter, the trusted third party 100 can decrypt the various encrypted carbon footprint data obtained by request by using the stored private key for decryption to check the various encrypted carbon footprint data.

In some embodiments, the trusted third party 100 may also request the chain code 31 from the first blockchain as needed. Thereafter, the trusted third party 100 can verify the correctness of the process of the homomorphic encryption operation of the carbon footprint data by checking the chain code 31 obtained by request.

In some embodiments, the system for carbon data ensures the confidentiality and authenticity of the carbon footprint data by using the first blockchain 30 and the homomorphic encryption algorithm, and provides the carbon footprint data while not revealing the privacy of suppliers by using the second blockchain 40 and the certifier, thus ensuring that the system for carbon data supports the authenticity, integrity and confidentiality of data at the micro level, while protecting the identity privacy of suppliers.

FIG. 1 only shows one material provider 50, one component manufacturer 10 and one product manufacturer 20 to explain the information transmission relationship between upstream and downstream suppliers. It should be understood that in practical application, the product manufacturer 20 can have a plurality of components manufacturers 10. Similarly, each component manufacturer 10 can have a plurality of material providers 50. In addition, it should be understood that there are multiple levels of component manufacturers (i.e. intermediate suppliers) between the material provider 50 and the product manufacturer 20.

Figure 2:
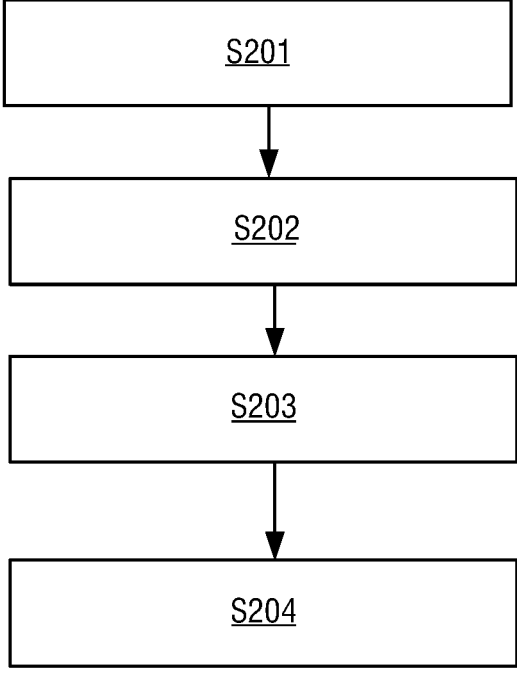
FIG. 2 is a schematic flowchart of an example method for managing carbon data incorporating teachings of the present disclosure.

Combined with the system for carbon data shown in FIG. 1, the method for managing carbon data according to an embodiment of the present disclosure will be described in detail hereinafter. FIG. 2 is a schematic flowchart of an example method for managing carbon data incorporating teachings of the present disclosure. The method can be executed by the component manufacturer in FIG. 1. As shown in FIG. 2, the method comprises the following steps.

S201, component carbon footprint data of a component is generated. The component carbon footprint data comprises material carbon footprint data of a material for manufacturing the component and addon carbon footprint data generated in the production and processing of the component.

Specifically, the component manufacturer 10 can request the material carbon footprint data from the material provider 50. In response, the material provider 50 provides the material carbon footprint data to the component manufacturer 10. It should be understood that the component can consist of various materials, and the component manufacturer 10 can have a plurality of material providers 50 corresponding to various materials. For the convenience of explanation, the present disclosure takes one material provider 50 as an example.

The process of the component manufacturer 10 manufacturing the component using the material may involve direct emissions such as combustion of fossil fuels, emissions from physical processes and/or chemical processes, and indirect emissions from external suppliers such as electricity, heat, cool air or steam. Accordingly, the addon component carbon footprint data is generated in the production and processing of the component.

The component manufacturer 10 can add the material carbon footprint data of the material and the addon component carbon footprint data generated in the production and processing of the component to generate the component carbon footprint data of the component.

S202, the encryption result of the addon component carbon footprint data 11 is stored in a first blockchain to trigger the first blockchain 30 to generate and store first encrypted component carbon footprint data 12 of the component based on the encryption result of the addon component carbon footprint data 11 and pre-stored first encrypted material carbon footprint data 51. The first encrypted material carbon footprint data 51 is an encryption result of the material carbon footprint data. The first encrypted material carbon footprint data 51 is stored in the first blockchain 30 by the material provider 50.

In some embodiments, both of the encryption result of the addon component carbon footprint data 11 and the first encrypted material carbon footprint data 51 are encrypted based on a public key for homomorphic encryption 101. The public key for homomorphic encryption 101 can be the public key for encryption in the key pair for homomorphic encryption generated by the trusted third party 100 in FIG. 1. After generating the key pair for homomorphic encryption, the trusted third party 100 stores the public key for encryption in the first blockchain 30, so that the public key for homomorphic encryption 101 can be acquired by accessing the first blockchain 30. For example, the material provider 50 can acquire the public key for homomorphic encryption 101 from the first blockchain 30, encrypt the material carbon footprint data by using the public key for homomorphic encryption 101 to generate the first encrypted material carbon footprint data 51, and store the first encrypted material carbon footprint data 51 in the first blockchain 30.

The component manufacturer 10 can acquire the public key for homomorphic encryption 101 from the first blockchain 30, and encrypt the addon component carbon footprint data of the component using the public key for homomorphic encryption 101 to generate the encryption result of the addon component carbon footprint data 11. Thereafter, when the encryption result of the addon component carbon footprint data 11 is stored in the first blockchain 30, the first blockchain is triggered to generate and store the first encrypted component carbon footprint data 12 based on the encryption result of the addon component carbon footprint data 11 and the first encrypted material carbon footprint data of the material 51.

In some embodiments, when the encryption result of the addon component carbon footprint data 11 is stored in the first blockchain 30, a chain code 31 in the first blockchain 30 to perform additive homomorphic operation on the encryption result of the addon component carbon footprint data 11 and the first encrypted material carbon footprint data 51 to generate and store the first encrypted component carbon footprint data 12. The additive homomorphic operation can enable the first encryption result obtained by performing the addition operation on the encryption result of at least two data to be equal to the encryption result of the sum of the at least two data.

For example, assuming that component X consists of material A and material B, the first encrypted material carbon footprint data of material A is Enc(PCF(A)), the first encrypted material carbon footprint data of material B is Enc(PCF(B)), the encryption result of addon component carbon footprint data of the component is Enc(PCF(X')), $\oplus$ is an addition homomorphic operator, and the following equivalence relation holds:

$$Enc(PCF(X)) = Enc(PCF(A) + PCF(B) + PCF(X'))$$
$$= Enc(PCF(A)) \oplus Enc(PCF(B)) \oplus Enc(PCF(X'))$$

In step S202, additive homomorphic operation is performed on the first blockchain 30, so that addition operation can be directly performed on the encryption data to generate the first encrypted component carbon footprint data, thus ensuring the confidentiality and integrity of the carbon footprint data. In addition, the first encrypted component carbon footprint data 12 is stored in the first blockchain 30, so that the product manufacturer 20 can request the first encrypted component carbon footprint data 12 from the first blockchain 30 to verify the validity of the component carbon footprint data.

S203, a first verifiable credential for average component carbon footprint data of a batch of components containing the component is acquired. A first public key 61 for verifying the first verifiable credential is stored in a second blockchain 40. The average component carbon footprint data is the average value of the carbon footprint data of all components in a batch of components containing the component.

In some embodiments, S203 comprises: providing the average component carbon footprint data to a first certifier 60, so that the first certifier 60 generates a first verifiable credential for the average component carbon footprint data and stores the first public key 61 in the second blockchain 40; and receiving the first verifiable credential generated by the first certifier 60.

After the component manufacturer 10 sends the average component carbon footprint data to the first certifier 60, the first certifier 60 verifies the average component carbon footprint data and generates a first verifiable credential for the average component carbon footprint data. The first public key 61 can be used to verify the first verifiable credential. Thereafter, the first certifier 60 stores its public key in the second blockchain 40 as the first public key 61, so as to facilitate the product manufacturer 20 to request the first public key 61 from the second blockchain 40 to verify the first verifiable credential. In addition, the first certifier 60 also returns the first verifiable credential to the component manufacturer 10, so that the component manufacturer 10 acquires the first verifiable credential.

S204, the component carbon footprint data and the first verifiable presentation generated based on the first verifiable credential are sent to the product manufacturer 20 in response to a component carbon footprint request from a product manufacturer 20, so that the product manufacturer 20 can verify the first verifiable presentation and the component carbon footprint data based on the first encrypted component carbon footprint data 12 stored in the first blockchain 30 and the first public key 61 stored in the second blockchain 40. When the product manufacturer 20 requests the component carbon footprint data from the component manufacturer 10, the component manufacturer 10 generates the first verifiable presentation of the component carbon footprint data by wrapping the first verifiable credential. The first verifiable presentation protects the identity privacy of the upstream supply chain through zero-knowledge proof.

After receiving the component carbon footprint data and the first verifiable presentation, the product manufacturer 20 can acquire the first public key 61 from the second blockchain 40, and verify the validity of the first verifiable presentation and the rationality of the component carbon footprint data based on the first public key 61, so as to ensure the authenticity of the data and the identity privacy of the upstream supply chain at the micro level.

In some embodiments, the component carbon footprint data of the component is generated, the encryption result of the addon component carbon footprint data 11 is stored in a first blockchain 30 to trigger the first blockchain 30 to generate and store first encrypted component carbon footprint data 12 of the component based on homomorphic encryption operation, so that the product manufacturer 20 can acquire the first encrypted component carbon footprint data 12 from the first blockchain 30 to verify the validity of the component carbon footprint data, thereby ensuring the confidentiality, integrity and traceability of the component carbon footprint data at the micro level. Further, a first verifiable credential for the average component carbon footprint data is acquired, and the first verifiable presentation generated based on the first verifiable credential is sent to the product manufacturer 20, so that the product manufacturer 20 can verify the validity of the first verifiable presentation and the rationality of the component carbon footprint data based on the first public key 61 stored in the second blockchain 40, so as to ensure the authenticity of the data and the identity privacy of suppliers at the micro level. Thus, this scheme ensures the reliability, security and transparency of the carbon footprint data while protecting the identity privacy of suppliers.

In some embodiments, prior to step S201, the method further comprises: acquiring the material carbon footprint data and the second verifiable presentation from a material provider 50, wherein the second verifiable presentation is generated based on a second verifiable credential for the average material carbon footprint data of a batch of materials containing the material; verifying the material carbon footprint data and the second verifiable presentation.

In some embodiments, the component manufacturer 10 can request the material carbon footprint data from the material provider 50. In response, the material provider 50 provides the material carbon footprint data and the second verifiable presentation to the component manufacturer 10, so that the material provider 10 can acquire the material carbon footprint data and the second verifiable presentation. The second verifiable presentation is generated by wrapping the second verifiable credential. The second certifier 70 generates the second verifiable credential by verifying the average material carbon footprint data of a batch of materials containing the material. The second verifiable presentation protects the identity privacy of the upstream supply chain through zero-knowledge proof. The second verifiable presentation contains the average material carbon footprint data.

After acquiring the material carbon footprint data and the second verifiable presentation, the component manufacturer 10 can verify the material carbon footprint data and the second verifiable presentation to ensure the validity, rationality and authenticity of the material carbon footprint data. After the material carbon footprint data and second verifiable presentation are verified, the component manufacturer 10 generates the component carbon footprint data of the component according to the material carbon footprint data and the addon component carbon footprint data of the component.

In some embodiments, verifying the material carbon footprint data and the second verifiable presentation comprises: acquiring the first encrypted material carbon footprint data 51 from the first blockchain 30; acquiring a second public key 71 for verifying the second verifiable credential from the second blockchain 40; verifying the material carbon footprint data and the second verifiable presentation based on the first encrypted material carbon footprint data 51 and the second public key 71.

In some embodiments, the component manufacturer 10 may acquire the public key for homomorphic encryption 101 from the first blockchain 30, encrypt the material carbon footprint data by using the public key for homomorphic encryption 101 to generate second encrypted material carbon footprint data of the material; verifying the material carbon footprint data based on the comparison result between the first encrypted material carbon footprint data 51 and the second encrypted material carbon footprint data, so as to ensure the validity of the component carbon footprint data.

Moreover, the component manufacturer 10 may also acquire the second public key 71 from the second blockchain 40. As mentioned above, the second public key is the public key of the second certifier, and is stored in the second blockchain by the second certifier. The second public key is used to verify the second verifiable credential, and then can be used to verify the first verifiable presentation based on the second verifiable credential.

After acquiring the second public key 71, the component manufacturer 10 verifies the second verifiable presentation based on the second public key 71, ensuring the validity of the second verifiable presentation, and further ensuring the authenticity of the material carbon footprint data. In addition, in this implementation, because the second verifiable presentation is provided to the component manufacturer instead of the second verifiable credential, the identity privacy of suppliers is protected.

Figure 3:
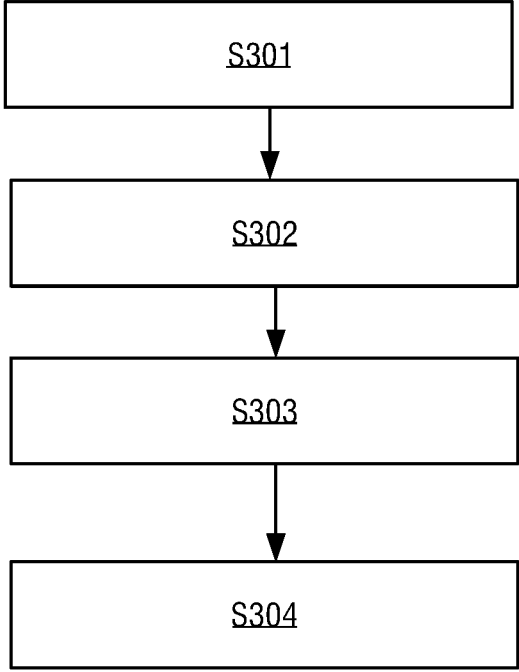
FIG. 3 is a schematic flowchart of another example method for managing carbon data incorporating teachings of the present disclosure.

FIG. 3 is a schematic flowchart of another example method for managing carbon data incorporating teachings of the present disclosure. The method can be executed by the product manufacturer 20 in FIG. 1. As shown in FIG. 3, the method comprises:

S301, component carbon footprint data of a component for manufacturing products and a first verifiable presentation is received. The first verifiable presentation is generated based on a first verifiable credential of f average component carbon footprint data of a batch of components containing the component.

The generation process of the first verifiable credential and the first verifiable presentation can refer to step S204 in FIG. 2, which will not be described in detail here.

When the product manufacturer 20 requests the component carbon footprint data from the component manufacturer 10, the component manufacturer 10 sends the component carbon footprint data and the first verifiable presentation to the product manufacturer 20, so that the product manufacturer 20 can receive the component carbon footprint data and the first verifiable presentation.

S302, first encrypted component carbon footprint data 12 of the component is acquired from a first blockchain (30). The first encrypted component carbon footprint data 12 is generated by the first blockchain 30 based on the encryption result of addon component carbon footprint data of the component and first encrypted material carbon footprint data 51 of a material for manufacturing the component.

S303, a first public key 61 for verifying the first verifiable credential is acquired from a second blockchain 40. The meaning and the generation process of the first public key 61 can refer to the first public key 61 in FIG. 1 and FIG. 2, which will not be described in detail here.

S304, the component carbon footprint data and the first verifiable presentation are verified based on the first encrypted component carbon footprint data 13 and the first public key 61.

In some embodiments, step S304 comprises: acquiring a public key for homomorphic encryption 101 from the first blockchain 30; encrypting the component carbon footprint data by using the public key for homomorphic encryption 101 to generate second encrypted component carbon footprint data of the component; performing a first verification on the component carbon footprint data based on the first encrypted component carbon footprint data 12) and the first verifiable presentation.

The meaning and the generation process of the public key used for homomorphic encryption 101 can refer to the embodiments shown in FIGS. 1 and 2, which will not be described in detail here. In this implementation, the component carbon footprint data is verified based on the comparison result between the first encrypted component carbon footprint data and the second encrypted component carbon footprint data, which ensures the validity and integrity of the carbon footprint data.

In this implementation, step S304 further comprises: verifying the first verifiable presentation based on the first public key 61; performing a second verification on the component carbon footprint data based on the comparison result between the component carbon footprint data and the average component carbon footprint data contained in the first verifiable presentation.

In this implementation, the first verifiable presentation is verified based on the first public key 61, so that the validity of the first verifiable presentation can be ensured, thus ensuring the authenticity of the component carbon footprint data. Furthermore, because the first verifiable presentation is verified by the first public key 61 instead of directly verifying the second verifiable credential, the identity privacy of suppliers is protected. In addition, the component carbon footprint data is verified based on the comparison result between the component carbon footprint data and the average component carbon footprint data, which ensures the rationality of the component carbon footprint data. The above verification depends on, but is not limited to, the sequence code, production date and value range of materials.

Based on the embodiment shown in FIG. 3, in some embodiments of the present disclosure, subsequent to step S304, the method further comprises: calculating the product carbon footprint data of the product based on the component carbon footprint data and the addon product carbon footprint data generated in the production and processing of the product.

Specifically, the process of the product manufacturer 20 manufacturing products using components may involve direct emissions such as combustion of fossil fuels, emissions from physical processes and/or processes, chemical and indirect emissions from external suppliers such as electricity, heat, cool air or steam. Accordingly, addon product carbon footprint data is generated in the production and processing of the product.

The product manufacturer 20 can add the component carbon footprint data of the component and the addon product carbon footprint data generated in the production and processing of the product to generate the product carbon footprint data of the product. In some embodiments, subsequent to step S304, the method further comprises: encrypting the addon product carbon footprint data by using the public key for homomorphic encryption 101 to generate an encrypted result of the addon product carbon footprint data 21; and storing the encrypted result of the addon product carbon footprint data 21 in the first blockchain 30 to trigger the first blockchain 30 to generate and store the first encrypted product carbon footprint data 22 of the product based on the encrypted result of the addon product carbon footprint data 21 and the first encrypted component carbon footprint data 12.

In this step, the principle and the process of generating the first encrypted product carbon footprint data of the product is similar to the principle and the process of generating the first encrypted component carbon footprint data of the component in step S202 in the embodiment of FIG. 2, which will not be described in detail here.

In this implementation, additive homomorphic operation is performed on the first blockchain 30, so that addition operation can be directly performed on the encrypted data to generate the first encrypted product carbon footprint data, and the first encrypted product carbon footprint data is stored in the first blockchain. In this way, the client 20 can request the first encrypted product carbon footprint data from the first blockchain 30 to verify the validity of the product carbon footprint data, thus ensuring the confidentiality and integrity of the carbon footprint data.

In some embodiments, subsequent to step S304, the method further comprises: generating average product carbon footprint data of a batch of products containing the product; providing the average product carbon footprint data to a third certifier 80, so that the third certifier 80 generates a third verifiable credential for the average product carbon footprint data, and stores a third public key for verifying the third verifiable credential in the second blockchain 40; and receiving the third verifiable credential generated by the third certifier 80.

In this step, the process and the effect of generating the third verifiable credential and the third public key 81 are similar to the process and the effect of generating the first verifiable credential and the first public key 61 in step S203 in the embodiment of FIG. 2, which will not be described in detail here.

In some embodiments, the method further comprises: sending, in response to the product carbon footprint request from a client 90, the product carbon footprint data and a third verifiable presentation generated based on the third verifiable credential to the client 90. Specifically, when the client 90 requests the product carbon footprint data from the product manufacturer 20, the product manufacturer 20 can generate the third verifiable presentation of the product carbon footprint data by wrapping the third verifiable credential. The third verifiable presentation protects the identity privacy of the upstream supply chain through zero-knowledge proof.

After receiving the product carbon footprint data and the third verifiable presentation, the client 90 can acquire the third public key 81 from the second blockchain 40, and verify the validity of the third verifiable presentation and the rationality of the component carbon footprint data based on the third public key 81, so as to ensure the authenticity of the data and the identity privacy of the upstream supply chain at the micro level.

The process and the principle of verifying product carbon footprint data at the client 90 is similar to the process and the principle of verifying component carbon footprint data at the product manufacturer 20, which will not be described in detail here.

In some embodiments, component carbon footprint data of a component for manufacturing a product and a first verifiable presentation are received, the first encrypted component carbon footprint data of the component 12 is acquired from a first blockchain 30, and a first public key 61 is acquired from a second blockchain 40, and thus the component carbon footprint data and the first verifiable presentation are verified based on the first encrypted component carbon footprint data 12 and the first public key 61, thereby ensuring the confidentiality, integrity and traceability of the product carbon footprint data at the micro level, and ensuring the authenticity of the data and the identity privacy of suppliers at the micro level. Thus, this scheme ensures the reliability, security and transparency of the carbon footprint data while protecting the identity privacy of suppliers.

Figure 4:
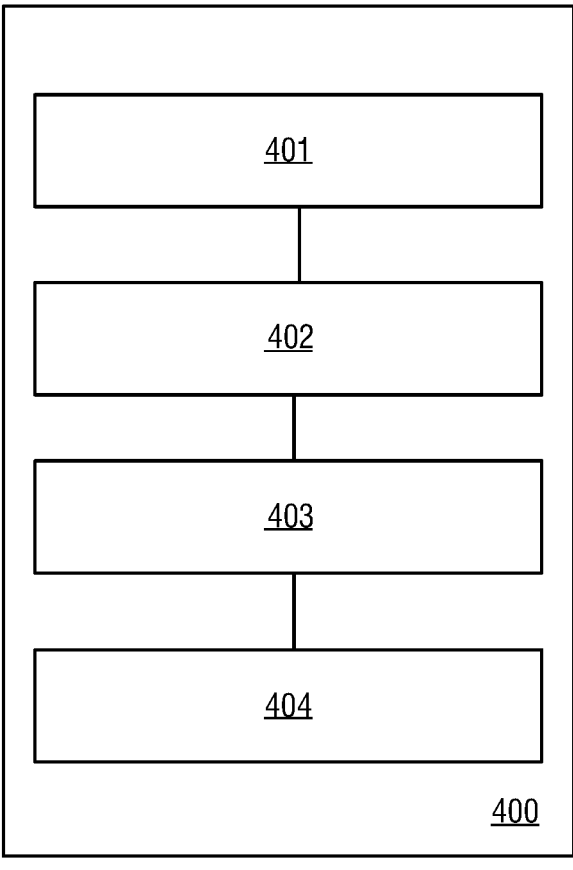
FIG. 4 is a schematic structural diagram of an example device for managing carbon data incorporating teachings of the present disclosure.

FIG. 4 is a schematic structural diagram of an example device for managing carbon data incorporating teachings of the present disclosure. The device for managing carbon data can be provided at the component manufacturer. As shown in FIG. 4, the device 400 comprises: a generating module 401, configured to generate component carbon footprint data of a component, wherein the component carbon footprint data comprises material carbon footprint data of a material for manufacturing the component and addon component carbon footprint data generated in the production and processing of the component; a triggering module 402, configured to store an encryption result of the addon component carbon footprint data in a first blockchain to trigger the first blockchain to generate and store first encrypted component carbon footprint data of the component based on the encryption result of the addon component carbon footprint data and pre-stored first encrypted material carbon footprint data; a credential acquiring module 403, configured to acquire a first verifiable credential for the average component carbon footprint data of a batch of components containing the component, wherein a first public key for verifying the first verifiable credential is stored in a second blockchain; and a sending module 404, send, in response to a component carbon footprint request from a product manufacturer, the component carbon footprint data and the first verifiable presentation generated based on the first verifiable credential to the product manufacturer, so that the product manufacturer verifies the first verifiable presentation and the component carbon footprint data based on the first encrypted component carbon footprint data stored in the first blockchain and the first public key stored in the second blockchain.

In some embodiments, the triggering module 402 is specifically configured to: call a chain cod in the first blockchain to perform additive homomorphic operation on the encryption result of the addon component carbon footprint data and the first encrypted material carbon footprint data to generate and store the first encrypted component carbon footprint data, wherein both of the encryption result of the addon component carbon footprint data and the first encrypted material carbon footprint data are encrypted based on a public key for homomorphic encryption.

In some embodiments, the device 400 further comprises an encryption module configured to: acquire the public key for homomorphic encryption from the first blockchain; and encrypt the addon component carbon footprint data based on the public key for homomorphic encryption, to obtain the encryption result of the addon component carbon footprint data.

In some embodiments, the credential acquiring module 403 is specifically configured to: provide the average component carbon footprint data to a first certifier, so that the first certifier generates a first verifiable credential for the average component carbon footprint data and stores the first public key in the second blockchain; receive the first verifiable credential generated by the first certifier.

In some embodiments, the device 400 further comprises: a first data acquiring module configured to acquire the material carbon footprint data and a second verifiable presentation from a material provider, wherein the second verifiable presentation is generated based on a second verifiable credential for average material carbon footprint data of a batch of materials containing the material; a verifying module configured to verify the material carbon footprint data and the second verifiable presentation.

In some embodiments, the verifying module 404 is specifically configured to: acquire the first encrypted material carbon footprint data from the first blockchain; acquire a second public key for verifying the second verifiable credential from the second blockchain; verify the material carbon footprint data and the second verifiable presentation based on the first encrypted material carbon footprint data and the second public key.

In some embodiments, the verifying module 404 is specifically configured to: acquire a public key for homomorphic encryption from the first blockchain; encrypt the material carbon footprint data by using the public key for homomorphic encryption to generate second encrypted material carbon footprint data of the material; perform a first verification on the material carbon footprint data based on the comparison result between the first encrypted material carbon footprint data and the second encrypted material carbon footprint data.

In some embodiments, the verifying module 404 is specifically configured to: verify the second verifiable presentation based on the second public key; perform a second verification on the material carbon footprint data based on the comparison result between the material carbon footprint data and the average material carbon footprint data contained in the second verifiable presentation.

A device for managing carbon data may be used to implement the corresponding methods for managing carbon data in the embodiment shown in FIG. 2 and has the beneficial effects of the corresponding method embodiments, which will not be described in detail here. In addition, the functional realization of each module of the device for managing carbon data of this embodiment can refer to the corresponding parts in the foregoing method embodiment, which will not be described in detail here.

Figure 5:
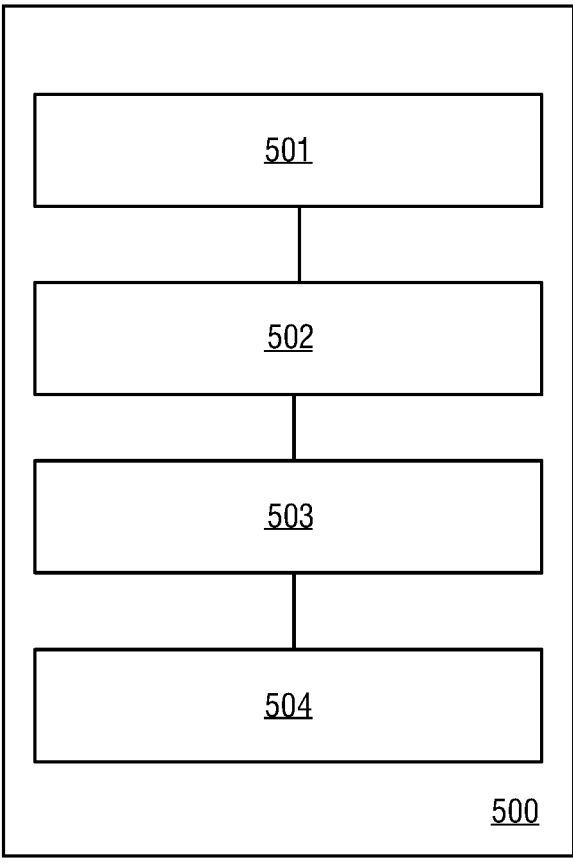
FIG. 5 is a schematic structural diagram of another example device for managing carbon data incorporating teachings of the present disclosure.

FIG. 5 is a schematic structural diagram of another example device for managing carbon data incorporating teachings of the present disclosure. The device for managing carbon data can be provided at the product manufacturer. As shown in FIG. 5, the device 500 comprises: a first receiving module 501, configured to receive component carbon footprint data for a component for manufacturing products and a first verifiable presentation, wherein the first verifiable presentation is generated based on a first verifiable credential of average component carbon footprint data of a batch of components containing the component; a data acquiring module 502, configured to acquire first encrypted component carbon footprint data of the component from a first blockchain; a key acquiring module 503, configured to acquire a first public key for verifying the first verifiable credential from a second blockchain; and a verifying module 504, configured to verify the component carbon footprint data and the first verifiable presentation based on the first encrypted component carbon footprint data and the first public key.

In some embodiments, the verifying module 504 is specifically configured to: acquire a public key for homomorphic encryption from the first blockchain; encrypt the component carbon footprint data by using the public key for homomorphic encryption to generate second encrypted component carbon footprint data of the component; perform a first verification on the component carbon footprint data based on the first encrypted component carbon footprint data and the first verifiable presentation.

In some embodiments, the verifying module 504 is specifically configured to: verify the first verifiable presentation based on the first public key (61); perform a second verification on the component carbon footprint data based on the comparison result between the component carbon footprint data and the average component carbon footprint data contained in the first verifiable presentation.

In some embodiments, the device 500 further comprises a triggering module configured to: acquire a public key for homomorphic encryption from the first blockchain; encrypt addon product carbon footprint data generated in the production and processing of the product by using the public key for homomorphic encryption to generate an encrypted result of the addon product carbon footprint data; store the encrypted result of the addon product carbon footprint data in the first blockchain to trigger the first blockchain to generate and store first encrypted product carbon footprint data of the product based on the encrypted result of the addon product carbon footprint data and the first encrypted component carbon footprint data.

In some embodiments, the device 500 further comprises: a generating module configured to generate average product carbon footprint data of a batch of products containing the product; a credential acquiring module configured to provide the average product carbon footprint data to a third certifier, so that the third certifier generates a third verifiable credential for the average product carbon footprint data, and stores a third public key for verifying the third verifiable credential in the second blockchain; a second receiving module configured to receive the third verifiable credential generated by the third certifier.

In some embodiments, the device 500 further comprises: a sending module configured to send, in response to a product carbon footprint request from a client, the product carbon footprint data and a third verifiable presentation generated based on the third verifiable credential to the client, wherein the product carbon footprint data comprises the component carbon footprint data and the addon product carbon footprint data generated in the production and processing of the product.

A device for managing carbon data may be used to implement the corresponding methods for managing carbon data in the embodiment shown in FIG. 3 and has the beneficial effects of the corresponding method embodiment, which will not be described in detail here. In addition, the functional realization of each module of the device for managing carbon data of this embodiment can refer to the corresponding parts in the foregoing method embodiment, which will not be described in detail here.

Figure 6:
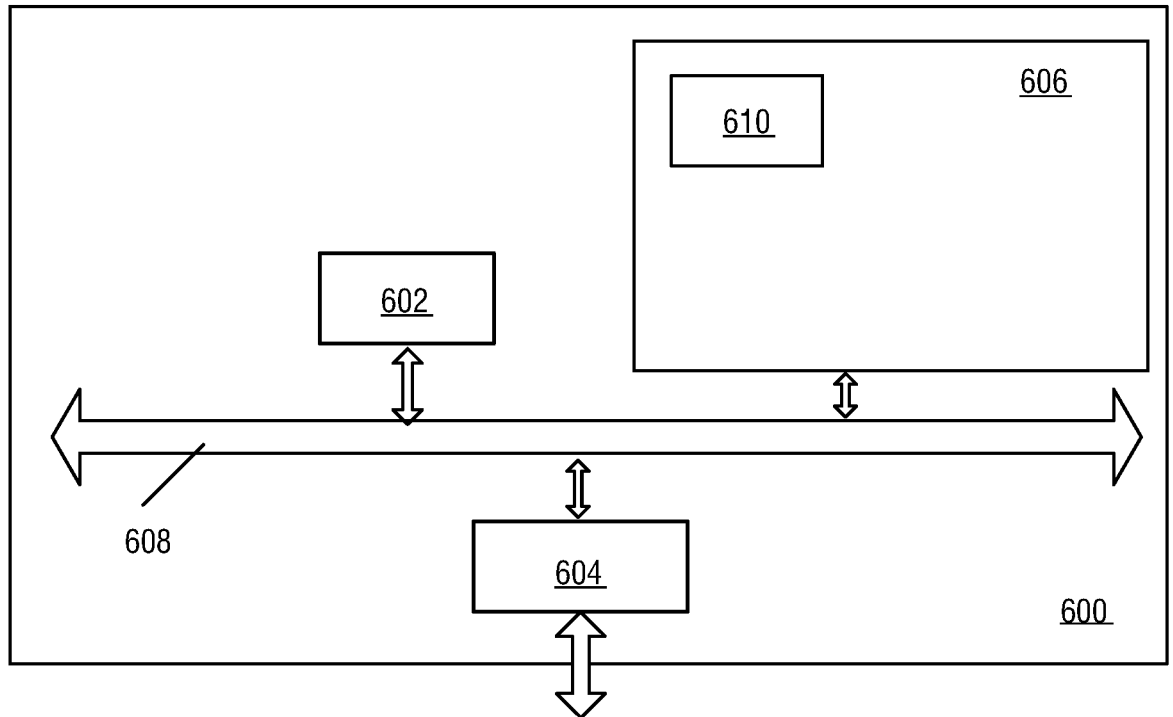
FIG. 6 is a schematic structural diagram of an electronic apparatus incorporating teachings of the present disclosure.

FIG. 6 is a schematic structural diagram of an example electronic apparatus incorporating teachings of the present disclosure. As shown in FIG. 6, the electronic apparatus may comprise a processor 602, a communication interface 604, a memory 606 in which a program (at least one executable instruction 610) is stored, and a communication bus 608.

The processor 602, the communication interface 604 and the memory 606 communicate with each other through the communication bus 608.

The communication interface 608 is configured to communicate with other electronic apparatuses or servers.

The processor 602 is configured to execute the program, and can specifically execute the relevant steps in the above method embodiment.

The program may comprise a program code including computer operation instructions.

The processor 602 may be a processor CPU, or an Application Specific Integrated Circuit (ASIC), or one or more integrated circuits configured to implement the embodiments of the present disclosure. One or more processors included in an intelligent device can be the same type of processors, such as one or more CPU; or different types of processors, such as one or more CPUs and one or more ASIC.

The memory 606 is configured to store programs. The memory 606 may include a high-speed RAM memory or a non-volatile memory, such as at least one disk memory.

The program can be used to cause the processor 602 to execute the method for managing carbon data provided in the foregoing method embodiment.

In addition, the specific implementation of each step in the program may refer to the corresponding description of the corresponding steps and units in the above method embodiments, which will not be described in detail here. Those skilled in the art can clearly understand that, for the convenience and conciseness of description, the specific working process of the above-described devices and modules can refer to the corresponding process description in the foregoing method embodiment, which will not be described in detail here.

It should be pointed out that, according to the requirement of implementation, each component/step described can be split into more components/steps, or two or more components/steps or partial operations of components/steps can be combined into new components/steps to achieve the purpose of the teachings of the present disclosure.

An example embodiment includes a storage medium in which computer executable instructions are stored, wherein the computer executable instructions, when executed, cause the processor to execute one or more of the methods described herein. The storage medium has the same working principle and technical effect as the foregoing method embodiment, which will not be described in detail here in order to avoid repetition.

Some embodiments include a computer program product, comprising a computer-readable storage medium in which a program is stored, wherein the program, after being loaded into a memory of a computer, causes the computer to execute one or more of the methods described herein. The computer program product has the same working principle and technical effect as the foregoing method embodiments, which will not be described in detail here in order to avoid repetition.

The present disclosure has been shown and explained in detail by the above drawings and example embodiments, but the present disclosure is not limited to these disclosed embodiments. Based on the above-mentioned embodiments, those skilled in the art can know that more embodiments of the present disclosure can be obtained by combining the code auditing means in the above-mentioned different embodiments, and these embodiments also fall within the scope of protection of the present disclosure.

What is claimed is:

1. A method for managing carbon data of a manufacturing component, the method comprising:

generating component carbon footprint data of the manufacturing component, wherein the component carbon footprint data comprises material carbon footprint data of a material for manufacturing the component and addon component carbon footprint data generated in the production and processing of the manufacturing component;

storing an encryption result of the addon component carbon footprint data in a first blockchain to trigger the first blockchain to generate and store first encrypted component carbon footprint data of the manufacturing component based on the encryption result of the addon component carbon footprint data and pre-stored first encrypted material carbon footprint data;

acquiring a first verifiable credential for average component carbon footprint data of a batch of components containing the manufacturing component, wherein a first public key for verifying the first verifiable credential is stored in a second blockchain; and sending, in response to a component carbon footprint request from a product manufacturer, the component carbon footprint data and the first verifiable presentation generated based on the first verifiable credential to the product manufacturer, so the product manufacturer verifies the first verifiable presentation and the component carbon footprint data based on the first encrypted component carbon footprint data stored in the first blockchain and the first public key stored in the second blockchain.

2. The method according to claim 1, wherein storing an encryption result of the addon component carbon footprint data in a first blockchain comprises calling a chain code in the first blockchain to perform additive homomorphic operation on the encryption result of the addon component carbon footprint data and the first encrypted material carbon footprint data to generate and store the first encrypted component carbon footprint data;

wherein both the encryption result of the addon component carbon footprint data and the first encrypted material carbon footprint data are encrypted based on a public key for homomorphic encryption.

3. The method according to claim 2, wherein before storing the encryption result of the addon component carbon footprint data in the first blockchain, the method further comprises:

acquiring the public key for homomorphic encryption from the first blockchain; and encrypting the addon component carbon footprint data based on the public key for homomorphic encryption to obtain the encryption result of the addon component carbon footprint data.

4. The method according to claim 2, wherein acquiring a first verifiable credential for average component carbon footprint data of a batch of components containing the manufacturing component comprises:

providing the average component carbon footprint data to a first certifier, so the first certifier generates a first verifiable credential for the average component carbon footprint data and stores the first public key in the second blockchain; and receiving the first verifiable credential generated by the first certifier.

5. The method according to claim 1, wherein before generating the component carbon footprint data of the manufacturing component, the method further comprises:

acquiring the material carbon footprint data and a second verifiable presentation from a material provider, wherein the second verifiable presentation is generated based on a second verifiable credential for average material carbon footprint data of a batch of materials containing the material; and verifying the material carbon footprint data and the second verifiable presentation.

6. The method according to claim 5, wherein verifying the material carbon footprint data and the second verifiable presentation comprises:

acquiring the first encrypted material carbon footprint data from the first blockchain;

acquiring a second public key for verifying the second verifiable credential from the second blockchain; and verifying the material carbon footprint data and the second verifiable presentation based on the first encrypted material carbon footprint data and the second public key.

7. The method according to claim 6, wherein verifying the material carbon footprint data and the second verifiable presentation based on the first encrypted material carbon footprint data and the second public key comprises:

acquiring a public key for homomorphic encryption from the first blockchain;

encrypting the material carbon footprint data by using the public key for homomorphic encryption to generate second encrypted material carbon footprint data of the material; and performing a first verification on the material carbon footprint data based on the comparison result between the first encrypted material carbon footprint data and the second encrypted material carbon footprint data.

8. The method according to claim 6, wherein verifying the material carbon footprint data and the second verifiable presentation based on the first encrypted material carbon footprint data and the second public key comprises:

verifying the second verifiable presentation based on the second public key; and performing a second verification on the material carbon footprint data based on the comparison result between the material carbon footprint data and the average material carbon footprint data contained in the second verifiable presentation.

9. A method for managing carbon data of a manufacturing component, the method comprising:

receiving component carbon footprint data of the manufacturing component for manufacturing products and a first verifiable presentation, wherein the first verifiable presentation is generated based on a first verifiable credential for average component carbon footprint data of a batch of components containing the manufacturing component;

acquiring first encrypted component carbon footprint data of the manufacturing component from a first blockchain;

acquiring a first public key for verifying the first verifiable credential from a second blockchain; and verifying the component carbon footprint data and the first verifiable presentation based on the first encrypted component carbon footprint data and the first public key.

10. The method according to claim 9, wherein verifying the component carbon footprint data and the first verifiable presentation based on the first encrypted component carbon footprint data and the first public key comprises:

acquiring a public key for homomorphic encryption from the first blockchain;

encrypting the component carbon footprint data by using the public key for homomorphic encryption to generate second encrypted component carbon footprint data of the manufacturing component; and performing a first verification on the component carbon footprint data based on the first encrypted component carbon footprint data and the first verifiable presentation.

11. The method according to claim 10, wherein verifying the component carbon footprint data and the first verifiable presentation based on the first encrypted component carbon footprint data and the first public key further comprises:

verifying the first verifiable presentation based on the first public key; and performing a second verification on the component carbon footprint data based on the comparison result between the component carbon footprint data and the average component carbon footprint data contained in the first verifiable presentation.

12. The method according to claim 9, wherein the method further comprises:

acquiring a public key for homomorphic encryption from the first blockchain;

encrypting addon product carbon footprint data generated in the production and processing of the product by using the public key for homomorphic encryption to generate an encrypted result of the addon product carbon footprint data; and storing the encrypted result of the addon product carbon footprint data in the first blockchain to trigger the first blockchain to generate and store first encrypted product carbon footprint data of the product based on the encrypted result of the addon product carbon footprint data and the first encrypted component carbon footprint data.

13. The method according to claim 12, wherein the method further comprises:

generating average product carbon footprint data of a batch of products containing the product;

providing the average product carbon footprint data to a third certifier, so the third certifier generates a third verifiable credential for the average product carbon footprint data, and stores a third public key for verifying the third verifiable credential in the second blockchain; and receiving the third verifiable credential generated by the third certifier.

14. The method according to claim 13, wherein the method further comprises sending, in response to a product carbon footprint request from a client, the product carbon footprint data and a third verifiable presentation generated based on the third verifiable credential to the client (90), wherein the product carbon footprint data comprises the component carbon footprint data and the addon product carbon footprint data generated in the production and processing of the product.

15. A system for managing carbon data of a manufacturing component, comprising:

a first blockchain to store an encryption result of addon component carbon footprint data generated in the production and processing of the manufacturing component, and to generate and store first encrypted component carbon footprint data of the component based on the encryption result of the addon component carbon footprint data and pre-stored first encrypted material carbon footprint data of a material for manufacturing the manufacturing component, so that the product manufacturer verifies component carbon footprint data of the manufacturing component based on the first encrypted component carbon footprint data;

a second blockchain to store a first public key for verifying a first verifiable credential for average component carbon footprint data of a batch of components containing the manufacturing component, so that the product manufacturer verifies the component carbon footprint data based on the first public key and a first verifiable presentation generated based on the first verifiable credential.

16. The system for managing carbon data according to claim 15, wherein:

the first blockchain calls a chain code in the first blockchain to perform additive homomorphic operation on the encryption result of the addon component carbon footprint data and the first encrypted material carbon footprint data to generate and store the first encrypted component carbon footprint data; and both of the encryption result of the addon component carbon footprint data and the first encrypted material carbon footprint data are encrypted based on a public key for homomorphic encryption.

17. The system for managing carbon data according to claim 15, wherein the first blockchain stores the public key for homomorphic encryption.

18. The system for managing carbon data according to claim 15, wherein the first public key is generated by a first certifier for verifying the average component carbon footprint data, and stored in the second blockchain.

19. The system for managing carbon data according to claim 15, wherein:

the first blockchain stores an encrypted result of addon product carbon footprint data generated in the production and processing of a product, and generates and stores first encrypted product carbon footprint data of the product based on the encrypted result of the addon product carbon footprint data and the first encrypted component carbon footprint data, so a client verifies product carbon footprint data of the product based on the first encrypted product carbon footprint data; and the second blockchain stores a third public key for verifying a third verifiable credential for average product carbon footprint data of a batch of products containing the product, so the client verifies the product carbon footprint data and a third verifiable presentation based on the third verifiable credential based on the third public key.

20. The system for managing carbon data according to claim 15, wherein the second blockchain stores a second public key for verifying a second verifiable credential for average material carbon footprint data of a batch of materials containing the material, so a component manufacturer verifies the material carbon footprint data of the material and a second verifiable presentation based on the second verifiable credential based on the second public key.

\* \* \* \* \*